P. SHANNON.
STREET WASHING APPARATUS.
APPLICATION FILED DEC. 17, 1908.
1,000,203.
Patented Aug. 8, 1911.
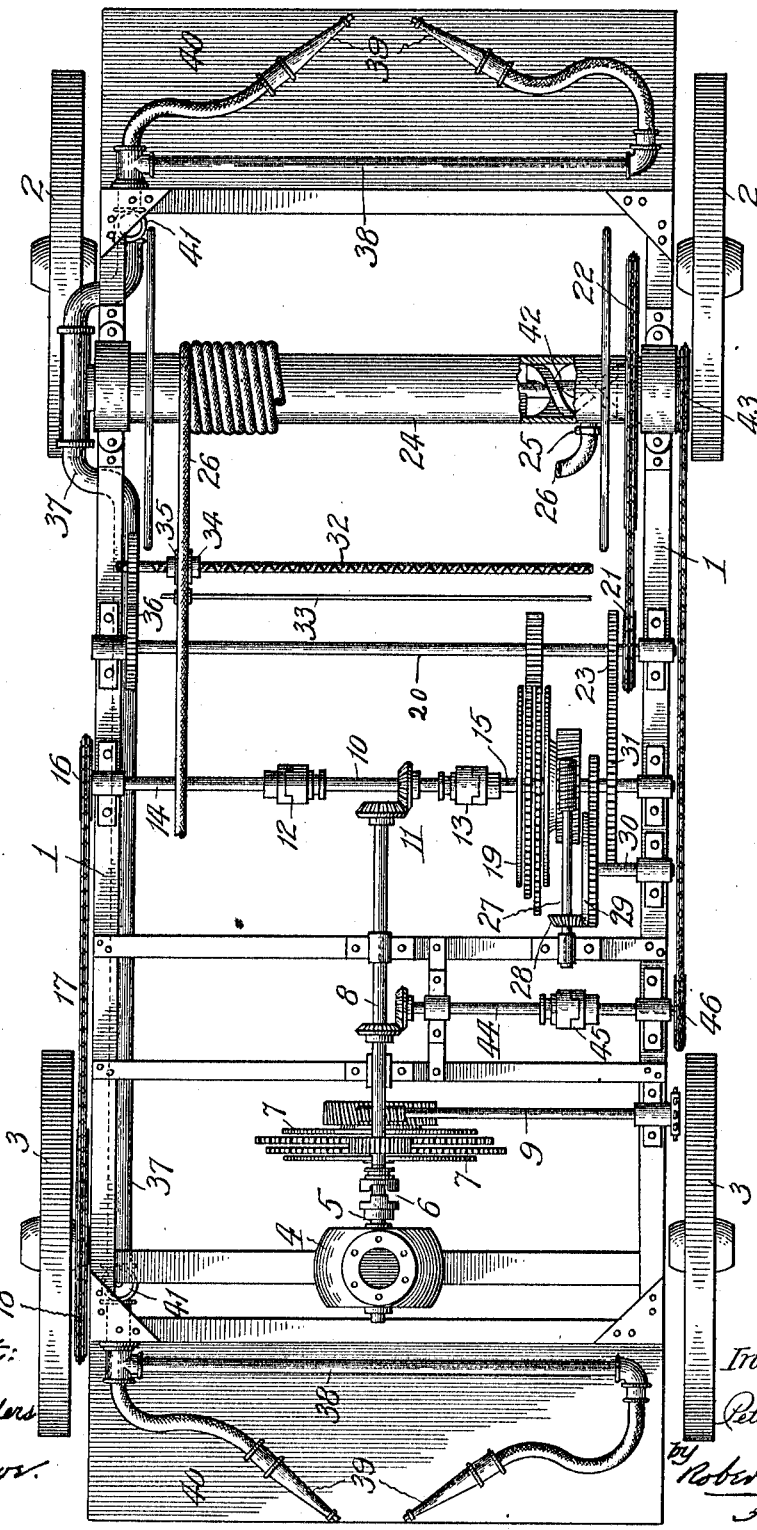

UNITED STATES PATENT OFFICE.

PETER SHANNON, OF CHICAGO, ILLINOIS.

STREET-WASHING APPARATUS.

1,000,203.　　　　Specification of Letters Patent.　　Patented Aug. 8, 1911.

Application filed December 17, 1908. Serial No. 468,017.

*To all whom it may concern:*

Be it known that I, PETER SHANNON, a citizen of the United States of America, and a resident of Chicago, in the county of Cook and State of Illinois, have invented certain new and useful Improvements in Street-Washing Apparatus, of which the following is a specification.

This invention relates to street washing apparatus, and more particularly to the type of such apparatus which forms the subject matter of my prior Letters Patent No. 726,580, dated April 28, 1903, in which the flexible hose which connects the stationary water supply with the portable reel of the delivery truck is automatically unwound as the operation of washing a predetermined length of the street progresses, and again rewound with a completion of the washing of the aforesaid length of street, and previous to a removal of the apparatus to a fresh section of the street. And the present improvement has for its object to provide a simple and efficient structural arrangement and combination of parts whereby the winding of the water supply hose upon the carrying reel of the apparatus is effected in an automatic manner, and with which the pumping of the water from said supply hose to the discharge hose of the apparatus is effected in a forcible and readily controlled manner, all as will hereinafter more fully appear.

The accompanying drawing is a plan view, partly in section, of an apparatus embodying the present improvements.

Referring to the drawings, 1 represents a motor truck frame of any ordinary and suitable construction and having front steering wheels 2 and rear driving wheels 3.

4 is a motor of any usual type mounted near the rear of the truck frame with its shaft 5 adapted for connection by a clutch 6 with the primary shaft of a variable speed and reversing mechanism 7, such for instance as forms the subject matter of my prior Patent No. 812,888, dated February 20, 1906, such patented construction being shown in plan view in illustration of the use of a suitable changeable speed mechanism in connection with the other elements of the present invention.

8 is the variable speed shaft of said mechanism; and 9 is a manually actuated shaft by which the housing of such mechanism is turned to change the speed imparted to the shaft 8, as well as to reverse the direction of rotation of the same, as set forth in detail in my aforesaid Letters Patent No. 812.888.

10 is a transverse shaft having bevel gear connection 11 with the aforesaid variable speed shaft 8. Said shaft 10 in turn has clutch connections 12 and 13 with two transverse shafts 14 and 15, as shown. The shaft 14 carries sprocket wheel 16 having driving connection by a chain 17 with a sprocket wheel 18 on the axle which carries the rear driving wheels 3 of the apparatus to propel the same along the roadway. The other transverse shaft 15 constitutes the primary shaft of a variable speed mechanism 19 similar in construction to the before described variable speed mechanism 7.

20 is the variable speed or driven shaft of the aforesaid mechanism 19, journaled transversely in the truck frame 1, and carrying a sprocket wheel 21 that has a driving chain connection with a sprocket wheel 22 on one end of the hose reel hereinafter described to impart rotation to said reel in the operation of the apparatus. In addition said shaft carries the primary pinion 23 of the automatically operating mechanism, hereinafter described, by which the speed of the variable speed shaft 20 is changed automatically as the winding and unwinding of the supply hose upon the hose reel of the apparatus progresses.

24 is the hose reel, above referred to, journaled transversely on the truck frame 1, and having a hollow cylindrical drum portion adapted to contain the hereinafter described pumping mechanism by which added force is imparted to the water passing through the apparatus in actual use.

25 is a lateral neck on the hollow drum of the hose reel 24 aforesaid, for the attachment of one end of a long lead of hose 26, the other end of which is adapted for attachment to a fire plug or other source of water supply under pressure. Such hose is adapted to be reeled upon, or unreeled from the hose reel 24 during the progress of the street washing operation, and as the apparatus moves toward or away from the source of water supply.

In the above mentioned reeling and unreeling of the supply hose it is necessary to the perfect operation of the apparatus that the hose wind and unwind at a uniform speed regardless of the quantity and corresponding diameter of the body of hose upon the hose reel. In the attainment of such uniform winding and unwinding speed of said hose it is necessary that the hose reel should have a fast rotation at the commencement of the winding operation, and that the speed of rotation be decreased as each succeeding layer of hose is wound upon the reel; and that in an unwinding operation the hose reel should have a slow rotation at the commencement, and that the speed of rotation be increased as each succeeding layer of hose is unwound from the hose reel. In the present improvement such results are attained by the variable speed mechanism 19 before described, and the automatic mechanism hereinafter described and by which the serial changes in said variable speed mechanism is effected.

27 is a shaft, one end of which has operative connection with the housing of the variable speed mechanism 19 and adapted to successively bring the different speed gearings thereof into active use. The other end of said shaft 27 is provided with a driven bevel pinion 28 meshing with a driving bevel sector 29 carried by a countershaft 30. Such bevel sector in its rotation is adapted to impart intermittent rotation to the shaft 27 and to the housing of the variable speed mechanism 19, to attain the above mentioned serial changes of said speed mechanism.

31 is a train of gears between the driven shaft 20 of the variable speed mechanism 19 and the countershaft 30 aforesaid, for imparting the necessary rotation to said shaft 30 and its bevel sector 29 in the operation of the apparatus.

32 is a shaft arranged transversely in adjacent relation to the hose reel 24, and formed with right and left hand spiral grooves or threads which intersect each other along the periphery of the shaft, and which communicate with each other at the ends of the shaft, as usual in such type of double threaded shafts.

33 is a guide rod arranged in parallel relation to the shaft 32 aforesaid.

34 is a movable carriage having a transverse reciprocating movement with relation to the truck frame 1 and supported in said movement by the shaft 32 and guide rod 33. Such carriage will have the usual engagement with the spiral grooves of the shaft 32 so that with a continued rotation of such shaft, the desired reciprocation of said carriage will be effected as usual in this type of mechanism.

35 is a loose sheave journaled on the carriage 34, and over which the lead of hose 26 is supported and guided in its uniform reeling and unreeling from the hose reel.

36, is a driving connection between the shaft 32, and the driven shaft 20 of the variable speed mechanism 19 aforesaid.

37 is a pipe extending the length of the truck frame 1 and having communication in any usual and suitable manner with one end of the hollow drum of the hose reel 24 and adapted to receive water therefrom.

38 are lateral pipe extensions at the forward and rear ends of the pipe 37; and 39 are discharge nozzles connected by short sections of flexible hose with the said pipe 37 and lateral pipe extensions 38, and adapted for use by the operators, located on front and rear platform 40 carried by the truck frame 1.

41 are valves in the pipe 38 for controlling the passage of water therethrough.

42 is a screw propeller or pump arranged within the hollow drum of the hose reel 24, with its shaft extending through one end of said reel and provided with a sprocket wheel 43.

44 is a transverse shaft formed in sections and connected together by a clutch 45. At one end said shaft has bevel gear connection with the variable speed shaft of the variable speed mechanism 7 aforesaid, and at its other end is provided with a sprocket wheel 46, having chain connection with the sprocket wheel 43 of screw pump 42, to impart motion to the same, and cause a forced circulation of the water through the apparatus and a forcible discharge thereof through the nozzle 39 by which the washing of the street is effected.

Having thus fully described my said invention what I claim as new and desire to secure by Letters Patent, is:—

1. In a street washing apparatus of the character herein described, the combination of a truck frame, a hose reel provided with a hollow drum and journaled on said frame, a lead of hose connected to said reel and adapted to reel thereon, a power shaft, a variable speed mechanism arranged intermediate of said shaft and hose reel, operative connections between said variable speed mechanism and said hose reel, automatic means for intermittently changing the variable speed mechanism, and a flexible discharge hose having connection with the hollow drum of the hose reel substantially as set forth.

2. In a street washing apparatus of the character herein described, the combination of a truck frame, a hose reel provided with a hollow drum and journaled on said frame, a lead of hose connected to said reel and adapted to reel thereon, a carriage having a transverse reciprocation at a side of the hose reel, means for imparting movement to said carriage, a power shaft, a variable speed mechanism arranged intermediate of said shaft and hose reel, operative connections between said variable speed mechanism and said hose reel, automatic means for intermittently changing the variable speed mechanism, and a flexible discharge hose having connection with the hollow drum of the hose reel, substantially as set forth.

3. In a street washing apparatus of the character herein described, the combination of a truck frame, a hose reel provided with a hollow drum and journaled on said frame, a lead of hose connected to said reel and adapted to reel thereon, a power shaft, a variable speed mechanism arranged intermediate of said shaft and hose reel, operative connections between said variable speed mechanism and said hose reel, means for intermittently changing the variable speed mechanism, a pump mechanism arranged in the hollow drum of the hose reel, means for operating said pump, and a flexible discharge hose having connection with the hollow drum of the hose reel, substantially as set forth.

4. In a street washing apparatus of the character herein described, the combination of a truck frame, a hose reel provided with a hollow drum and journaled on said frame, a lead of hose connected to said reel and adapted to reel thereon, a carriage having a transverse reciprocation at a side of the hose reel, means for imparting movement to said carriage, a power shaft, a variable speed mechanism arranged intermediate of said shaft and hose reel, operative connections between said variable speed mechanism and said hose reel, means for intermittently changing the variable speed mechanism, a pump mechanism arranged in the hollow drum of the hose reel, means for operating said pump, and a flexible discharge hose having connection with the hollow drum of the hose reel, substantially as set forth.

5. In a street washing apparatus of the character herein described, the combination of a motor truck, a motor mounted on said truck, a variable speed mechanism operated by said motor and having a driven shaft extending longitudinally of the truck, means for manually changing said variable speed mechanism, a series of transverse shafts operatively connected to said driven shaft, a driving connection between one of said transverse shafts and the drive wheels of the motor truck, a hose reel provided with a hollow drum and journaled on said truck, a lead of hose connected to said reel and adapted to reel thereon, a variable speed mechanism arranged intermediate of another of the transverse shafts aforesaid and the hose reel, operative connections between said variable speed mechanism and said hose reel, automatic means for intermittently changing said variable speed mechanism, and a flexible discharge hose having connection with the hollow drum of the hose reel, substantially as set forth.

6. In a street washing apparatus of the character herein described, the combination of a motor truck, a motor mounted on said truck, a variable speed mechanism operated by said motor and having a driven shaft extending longitudinally of the truck, means for manually changing said variable speed mechanism, a series of transverse shafts operatively connected to said driven shaft, a driving connection between one of said transverse shafts and the drive wheels of the motor truck, a hose reel provided with a hollow drum and journaled on said truck, a lead of hose connected to said reel and adapted to reel thereon, a carriage having a transverse reciprocation at the side of the hose reel, means for imparting movement to said carriage, a variable speed mechanism arranged intermediate of another of the transverse shafts aforesaid and the hose reel, operative connections between said variable speed mechanism and said hose reel, automatic means for intermittently changing said variable speed mechanism, and a flexible discharge hose having connection with the hollow drum of the hose reel, substantially as set forth.

7. In a street washing apparatus of the character herein described, the combination of a motor truck, a motor mounted on said truck, a variable speed mechanism operated by said motor and having a driven shaft extending longitudinally of the truck, means for manually changing said variable speed mechanism, a series of transverse shafts operatively connected to said driven shaft, a driving connection between one of said transverse shafts and the drive wheels of the motor truck, a hose reel provided with a hollow drum and journaled on said truck, a lead of hose connected to said reel and adapted to reel thereon, a variable speed mechanism arranged intermediate of another of the transverse shafts aforesaid and the hose reel, operative connections between said variable speed mechanism and said hose reel, means for intermittently changing said variable speed mechanism, a pump mechanism arranged in the hollow drum of the hose reel, means for operating said pump, and a flexible discharge hose having connection with the hollow drum of the hose reel, substantially as set forth.

8. In a street washing apparatus of the character herein described, the combination of a motor truck, a motor mounted on said truck, a variable speed mechanism operated by said motor and having a driven shaft extending longitudinally of the truck, means for manually changing said variable speed mechanism, a series of transverse shafts operatively connected to said driven shaft, a driving connection between one of said transverse shafts and the drive wheels of the motor truck, a hose reel provided with a hollow drum and journaled on said truck, a lead of hose connected to said reel and adapted to reel thereon, a carriage having a transverse reciprocation at the side of the hose reel, means for imparting movement to said carriage, a variable speed mechanism arranged intermediate of another of the transverse shafts aforesaid and the hose reel, operative connections between said variable speed mechanism and said hose reel, means for intermittently changing said variable speed mechanism, a pump mechanism arranged in the hollow drum of the hose reel, means for operating said pump, and a flexible discharge hose having connection with the hollow drum of the hose reel, substantially as set forth.

9. In a street washing apparatus of the character herein described, the combination of a truck frame having a platform at each end, a hose reel provided with a hollow drum and journaled on said frame, a lead of hose connected to said reel and adapted to reel thereon, a power shaft, a variable speed mechanism arranged intermediate of said shaft and hose reel, operative connections between said variable speed mechanism and said hose reel, automatic means for intermittently changing the variable speed mechanism, a longitudinally arranged pipe having connection with the hollow drum of the hose reel, and flexible discharge hose connected to the ends of said pipe adjacent to the end platforms of the truck frame, substantially as set forth.

10. In a street washing apparatus of the character herein described, the combination of a truck frame having a platform at each end, a hose reel provided with a hollow drum and journaled on said frame, a lead of hose connected to said reel and adapted to reel thereon, a carriage having a transverse reciprocation at a side of the hose reel, means for imparting movement to said carriage, a power shaft, a variable speed mechanism arranged intermediate of said shaft and hose reel, operative connections between said variable speed mechanism and said hose reel, automatic means for intermittently changing the variable speed mechanism, a longitudinally arranged pipe having connection with the hollow drum of the hose reel, and a flexible discharge hose connected to the ends of said pipe adjacent to the end platforms of the truck frame, substantially as set forth.

11. In a street washing apparatus of the character herein described, the combination of a truck frame having a platform at each end, a hose reel provided with a hollow drum and journaled on said frame, a lead of hose connected to said reel and adapted to reel thereon, a power shaft, a variable speed mechanism arranged intermediate of said shaft and hose reel, operative connections between said variable speed mechanism and said hose reel, means for intermittently changing the variable speed mechanism, a pump mechanism arranged in the hollow drum of the hose reel, means for operating said pump, a longitudinally arranged pipe having connection with the hollow drum of the hose reel, and flexible discharge hose connected to the ends of said pipe adjacent to the end platforms of the truck frame, substantially as set forth.

12. In a street washing apparatus of the character herein described, the combination of a truck frame having a platform at each end, a hose reel provided with a hollow drum and journaled on said frame, a lead of hose connected to said reel and adapted to reel thereon, a carriage having a transverse reciprocation at a side of the hose reel, means for imparting movement to said carriage, a power shaft, a variable speed mechanism arranged intermediate of said shaft and hose reel, operative connections between said variable speed mechanism and said hose reel, means for intermittently changing the variable speed mechanism, a pump mechanism arranged in the hollow drum of the hose reel, means for operating said pump, a longitudinally arranged pipe having connection with the hollow drum of the hose reel, and flexible discharge hose connected to the ends of said pipe adjacent to the end platforms of the truck frame, substantially as set forth.

Signed at Chicago Illinois this 11th day of December 1908.

PETER SHANNON.

Witnesses:
ROBERT BURNS,
HENRY MOE.

Copies of this patent may be obtained for five cents each, by addressing the "Commissioner of Patents. Washington, D. C."